(12) United States Patent
Priebe et al.

(10) Patent No.: US 12,266,988 B2
(45) Date of Patent: Apr. 1, 2025

(54) ELECTRIC MACHINE WITH FLEXIBLE ELECTRICAL CONDUCTORS AND SHAPING INSULATIONS

(71) Applicant: Robert Bosch GmbH, Stuttgart (DE)

(72) Inventors: Patrick Priebe, Wennigsen (DE); Sven Kreutzkamp, Pattensen (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 17/915,180

(22) PCT Filed: Jan. 25, 2021

(86) PCT No.: PCT/EP2021/051569
§ 371 (c)(1),
(2) Date: Sep. 28, 2022

(87) PCT Pub. No.: WO2021/197679
PCT Pub. Date: Oct. 7, 2021

(65) Prior Publication Data
US 2023/0118257 A1    Apr. 20, 2023

(30) Foreign Application Priority Data

Mar. 30, 2020  (DE) ................... 10 2020 204 136.9

(51) Int. Cl.
*H02K 15/10* (2025.01)
*H02K 3/12* (2006.01)
*H02K 3/28* (2006.01)

(52) U.S. Cl.
CPC ............. *H02K 15/105* (2013.01); *H02K 3/12* (2013.01); *H02K 3/28* (2013.01)

(58) Field of Classification Search
CPC ........... H02K 15/105; H02K 3/12; H02K 3/28
See application file for complete search history.

(56) References Cited

U.S. PATENT DOCUMENTS 6,288,470 B1 * 9/2001 Breit .................. H02K 3/30
310/254.1
10,177,631 B1 * 1/2019 Hopkins ............. H02K 1/148
(Continued)

FOREIGN PATENT DOCUMENTS

EP        1154543 A2    11/2001
JP     2020018169 A     1/2020
(Continued)

OTHER PUBLICATIONS

Translation of International Search Report for Application No. PCT/EP2021/051569 dated Apr. 13, 2021 (2 pages).

*Primary Examiner* — Forrest M Phillips
(74) *Attorney, Agent, or Firm* — Michael Best & Friedrich LLP

(57) ABSTRACT

The present invention relates to an electric machine (1) having a rotor (3) and a stator (2), wherein the stator (2) and/or the rotor (3) has an electrical plug-in winding (4), which comprises a plurality of rigid insulated electrical conductor elements (5); the conductor elements (5) are arranged in grooves of the stator or of the rotor and their conductor ends (17) project out of the grooves; the conductor ends of the conductor elements (5) are each connected to conductor ends of other conductor elements (5) in order to form the electrical plug-in winding (4); the conductor elements (5) have an electrically insulating insulation sheath (9); characterized in that each conductor element (5) has a multiplicity of flexible fibres (8), in particular of a conductor strand of flexible fibres (8), made of carbon nanotubes or graphene and in that the insulation sheath (9) surrounds the multiplicity of fibres (8) like a hose and is designed in such a way that it gives the electrical conductor element (5) a rigid form.

16 Claims, 4 Drawing Sheets

(56) References Cited

U.S. PATENT DOCUMENTS

| | | | | |
|---|---|---|---|---|
| 11,296,322 B2* | 4/2022 | Oguni | ............... | C25D 13/12 |
| 2013/0278183 A1* | 10/2013 | Liang | ............... | H02M 1/126 |
| | | | | 318/400.2 |
| 2019/0363601 A1* | 11/2019 | Kneidl | ............... | H02K 15/064 |
| 2021/0066983 A1* | 3/2021 | McSheery | ............ | H02K 1/145 |
| 2023/0054794 A1* | 2/2023 | Fatemi | ............... | H02K 3/345 |

FOREIGN PATENT DOCUMENTS

| | | | | | |
|---|---|---|---|---|---|
| KR | 20200094045 A | * | 6/2020 | | |
| WO | 2007124985 A1 | | 11/2007 | | |
| WO | 2018177767 A1 | | 10/2018 | | |
| WO | WO-2018210479 A1 | * | 11/2018 | | |
| WO | WO-2019022448 A1 | * | 1/2019 | ............... | H02K 1/02 |

* cited by examiner

ELECTRIC MACHINE WITH FLEXIBLE ELECTRICAL CONDUCTORS AND SHAPING INSULATIONS

BACKGROUND OF THE INVENTION

The present invention relates to an electric machine having a rotor and a stator. The rotor and/or stator have a plug-in winding, which is formed by flexible electrical conductors and shaping insulations. The present invention moreover relates to a method for producing electrical conductor elements for a plug-in winding for a rotor and/or a stator of an electric machine.

The present invention furthermore relates to a shaping device for producing electrical conductor elements for a plug-in winding for a rotor and/or a stator of an electric machine.

With the transition from the use of fossil fuels to renewable energies, the type of drive used in vehicles has also been brought to the fore. Due to the tightening of legal requirements relating to harmful vehicle emissions, the development of alternative vehicle drives has accelerated in recent years.

In this regard, the development of purely electric drives has played an increasingly important role in the development of sustainable drive types for vehicles. In this regard, automobile manufacturers are continuing to develop electric drive machines so as to offer efficient everyday alternatives to internal combustion engines.

In particular, the winding technique for the coil windings of a stator and a rotor of an electric machine has a substantial influence on the power and the efficiency of the electric machine. Therefore, the coil winding method also represents a key factor in the production and development of high power coil windings for electric machines for vehicle drives.

It is generally known to form the stator winding of an electric machine using a plug-in technique. In this case, insulated conductor elements are inserted into a stator body. The individual inserted conductor elements are subsequently interconnected to form the winding of the respective stator. To achieve the desired form of the individual conductor elements, the insulated conductor elements are bent into their desired form via a plurality of bending procedures prior to their insertion into the stator body.

SUMMARY OF THE INVENTION

The inventive electric machine has, in particular, an optimized power density. The electric machine comprises a rotor and a stator, wherein the rotor and/or the stator have a plug-in winding. The plug-in winding comprises a plurality of rigid insulated electrical conductor elements, wherein the conductor elements are arranged in grooves of the stator or the rotor. In this case, conductor ends project out of the grooves, wherein the conductor ends of the conductor elements are each connected to conductor ends of other conductor elements in order to form the electrical plug-in winding. The conductor elements each have an insulation sheath. Moreover, each conductor element has a multiplicity of electrically conductive flexible fibers, which are, in particular, a conductor bundle of flexible fibers. This multiplicity of fibers is tubularly surrounded by the insulation sheath. The insulation sheath is moreover designed in such a way that it gives the electrical conductor element a rigid form. The insulation sheath therefore has, in particular, a tubular or sleeve-like design and the flexible fibers are arranged inside the insulation sheath. The insulation sheath preferably enables the conductor elements to be designed with a minimized volume and maximized fill-ratio.

The flexible fibers are preferably formed from carbon nanotubes or graphene. Carbon nanotubes or graphene have a particularly high electrical conductivity along with a low density.

Moreover, the use of carbon nanotubes or graphene enables a particularly high fill-density of the conductor elements and thus a particularly high fill-factor of the electric machine. Consequently, the power density of the electric machine can be increased. Moreover, the material usage can be reduced due to the higher electrical conductivity of the electrical conductors, which, together with the low density of the conductors, results in a reduction in the weight of the electric machine and in lower production costs of the electric machine. Alternatively, metal fibers or conductive polymers and yarns can be used as electrical conductors, which can be made conductive by doping, for example.

In particular, in contrast to the previous plug-in winding, instead of a bent copper conductor, which maintains its form after the bending procedure, a multiplicity of electrically conductive, flexible fibers are therefore used. In a departure from the copper plug-in windings known from the prior art, the form of the conductor element is therefore not produced by the flexible fibers but by the rigid insulation sheath. Consequently, a plastic shaping property, as was previously the case in copper conductors, is not a necessary prerequisite when choosing the conductor material. It is therefore also possible to use flexible electrical conductors, i.e. the fibers, which results in a substantially greater choice of materials for the electrical conductors. In particular, this enables the use of the above-described materials with a lower density so as to reduce the weight of the electric machine as a whole.

Furthermore, by using flexible fibers, a higher fill-factor of the electric machine can be achieved. A flexible material is generally characterized by a low modulus of elasticity and a high deformability as a consequence of low forces and moments. The own weight of a flexible fiber is generally sufficient to deform the material.

In this case, flexible fibers do not have a rigid form and hence cannot be formed into a particular pre-defined shape as a result of a bending procedure. They are therefore arranged inside the shaping insulation sheath in order to attain a fixed form. In contrast to this, a rigid material is defined in that a fixed shaping of the material can be maintained after a shaping process, without the support of an additional element or material. A substantial change in form can only be effected through the application of relatively high forces. In any case, the own weight of the conductor is not sufficient here.

The subclaims demonstrate preferred developments of the invention.

The insulation sheath is advantageously thermally shrunk onto the multiplicity of flexible fibers. Simple and cost-effective assembly of the electrical conductor element is thus achieved. The insulation sheath is particularly advantageously shrinkable tubing. Simple and, at the same time, reliable shaping of the electrical conductor element is thus achieved.

The insulation sheath particularly advantageously braces the multiplicity of flexible fibers, in particular the conductor bundle. A tensile force is thus present in the insulation sheath. This results in tightly packed flexible fibers inside the electrical conductor element. The above-described low volume and the high fill-ratio can thus be advantageously achieved.

The insulation sheath is preferably formed by a thermoplastic material, in particular from polyether ether ketone. Polyether ether ketone (PEEK) is a thermoplastic material, which, owing to its high temperature resistance and its resistance to high-energy electromagnetic waves, is suitable for use as an insulation sheath of electrical conductor elements in electric machines. This is because polyether ether ketone has a comparatively high melting point compared to other plastic materials, which is why polyether ketone is also not impaired at relatively high operating temperatures of the electric machine. Moreover, owing to its thermoplastic deformability, polyether ether ketone is also particularly suitable for effecting rigid shaping of the electrical conductor elements individually and in a flexible manner. The polyether ether ketone can act as a substantially rigid shaping element through heating, for example. Different geometries and dimensions of the conductor elements can thus be generated with comparatively little effort. However, other thermoplastics, which either already have a substantially rigid form or can undergo a hardening process, for example through the application of heat, are also conceivable.

In a preferred configuration, the insulation sheath is manufactured from an insulation material which has a negative coefficient of expansion. The insulation sheath can therefore be applied to the fibers in a simple and reliable manner, wherein the fibers are reliably held in the insulation sheath. Heating of the electrical conductor element therefore results in a stronger hold of the conductor element owing to the negative expansion, i.e. shrinking, of the insulation material.

In an exemplary embodiment, each conductor element can be designed in a U shape or an I shape. It is preferably moreover provided that the conductor elements have a quadrangular, in particular rectangular, cross section. Such a form of the conductor elements enables the interconnection of the individual elements in a simple manner. A U-shaped conductor element is particularly preferred, since the plug-in windings therefore only have to be interconnected at an end face of the rotor and/or stator, whereby the interconnection effort and therefore also the production costs for the electric machine can be reduced. Moreover, the number of connecting points in the rotor and/or stator can thus be reduced, thereby further reducing the assembly effort. Moreover, the dimensions of the housing of the electric machine can thus be reduced, whereby the power density of the electric machine can be further increased.

The invention moreover relates to a method which improves the production of plug-in windings for rotors and/or stators of an electric machine. This method for producing substantially rigid insulated electrical conductor elements for a plug-in winding for a rotor and/or a stator of an electric machine, in particular an electric drive machine for an electrically driven vehicle, has, in particular, the following steps:

Firstly, a bundle of flexible fibers made of carbon nanotubes or graphene are surrounded by a tubular insulation sheath to form a conductor element. The insulation sheath is preferably thermoplastically deformable. The conductor element is then arranged in a depression of a shaping device. The depression therefore has a shaping effect on the conductor element. The conductor element is subsequently heated in the depression of the shaping device by means of at least one heating element. The heating takes place to a temperature which effects thermal shrinking, in particular a contraction, of the insulation sheath. The fibers arranged inside the insulation sheath preferably lie closely adjacent to one another on the one hand and closely adjacent to the insulation material on the other. The tight packing of the fibers can thus be achieved. After the heating process, cooling of the conductor element takes place. As a result of the heating and/or cooling, the insulation sheath is preferably moreover hardened so that the electrical conductor element maintains the form specified by the depression. In this case, the shaping of the conductor element is effected by the insulation sheath. As a result of the method, in particular in contrast to the known bending procedure of insulated copper lines, the shaping of the conductor elements is not achieved by bending but by arranging the insulation sheath and the flexible, electrically conductive fibers in the depression formed in the shaping device and by subsequently heating the insulation sheath. In this case, the form of the depression corresponds substantially to the desired form of the conductor element. In the method, the shaping and the insulation of the electrical conductors are advantageously carried out in a single method step, thereby reducing the number of method steps. As a result of the inventive method, different forms of the conductor elements can be produced flexibly, quickly and precisely. Different geometries and dimensions of the conductor elements are thus possible through the use of different shaping devices. The insulation sheath is advantageously flexible before the heat is introduced and can be non-destructively deformed without applying high forces. In this case, the flexible insulation sheath does not maintain its form without support from external forces. In the inventive method, before the heating process, the flexible insulation sheath is held in the desired form with the aid of the shaping depression. The insulation sheath is preferably sleeve-like or tubular. The flexible fibers are preferably guided through the sleeve-like or tubular insulation sheath. The insulation sheath can also comprise a plurality of segments which are inserted along the course of the depression and surround the flexible fibers in sections, preferably in direct succession in each case. The individual segments can preferably be materially bonded to one another by heating. The insulation sheath is preferably manufactured from a thermoplastic material, in particular from polyether ether ketone. In particular, a hardening procedure can be carried out by heating and cooling, preferably with passive temperature reduction. In this case, the temperature reduction can be effected for example merely by interrupting the heat supply. Moreover, the hardening procedure can comprise active temperature reduction, for example active cooling, in particular by means of cooling elements and/or forced convention. The hardening procedure of the conductor elements preferably takes place in the depression of the shaping device. In particular, a negative temperature coefficient of the insulation sheath effects bracing of the flexible fibers inside the insulation sheath and enables the entire cross-sectional volume of the conductor element to be filled. This produces the form of the conductor element completely, whereby a compact conductor element with a high fill-density is generated. The conductor element can subsequently be removed from the depression of the shaping device in a stress-free manner.

BRIEF DESCRIPTION OF THE DRAWINGS

Exemplary embodiments of the invention are described in detail below with reference to the accompanying drawing. In the drawing.

DETAILED DESCRIPTION

Figure 1:
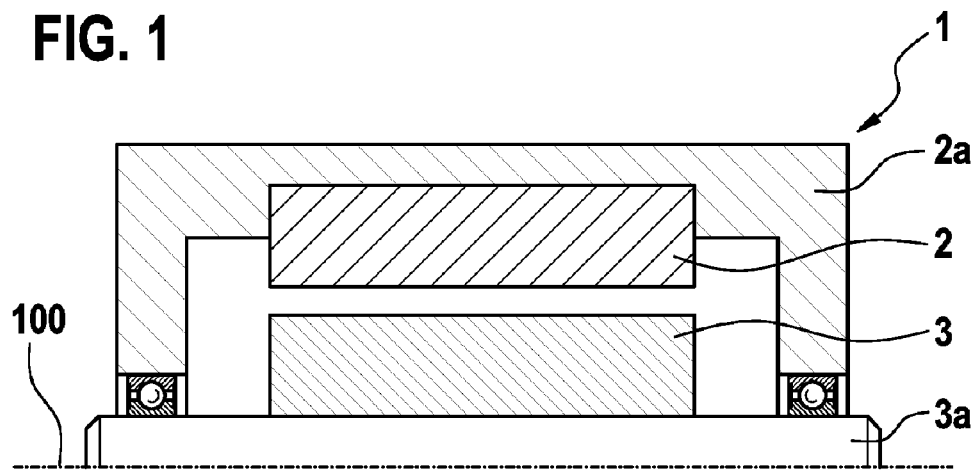
FIG. 1 shows a schematic view of an electric machine according to an exemplary embodiment of the invention.

FIG. 1 shows a schematic representation of an electric machine 1 according to an exemplary embodiment of the invention. The electric machine 1 has a rotor 3 and a stator 2. The stator 2 is arranged on a housing 2a, wherein a rotor shaft 3a, to which the rotor 3 is attached, is rotatably mounted on the housing 2a. The rotor 3 is therefore rotatable about a center axis 100, wherein the center axis 100 is also a center axis of the stator 2. The electric machine 1 is particularly advantageously a drive system for a vehicle, for example an automobile or a bicycle.

Figure 2:
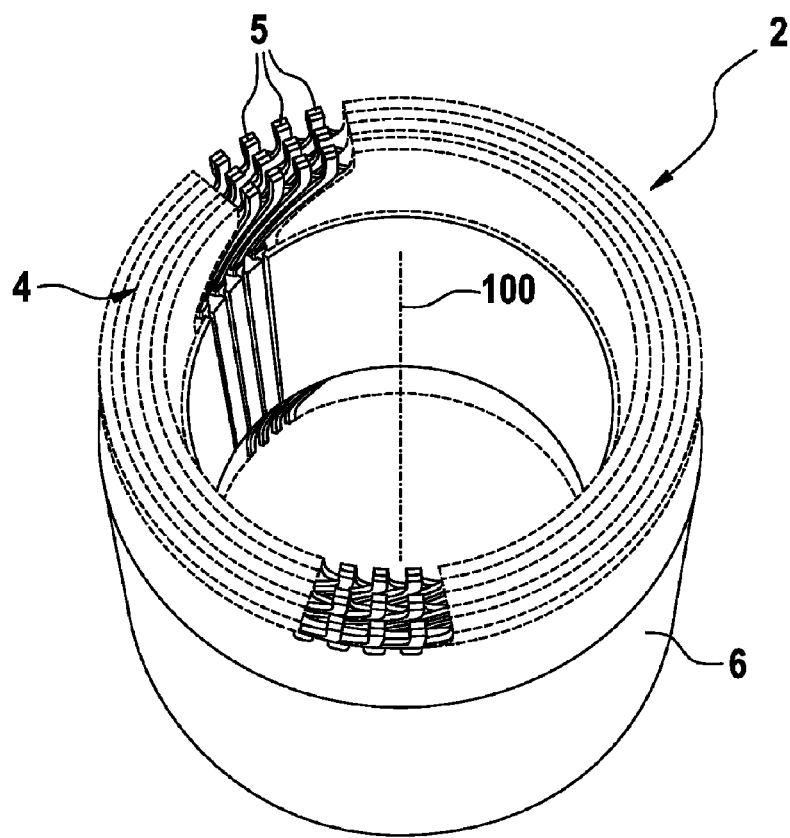
FIG. 2 shows a schematic view of a stator of the electric machine according to the exemplary embodiment of the invention.
Figure 3:
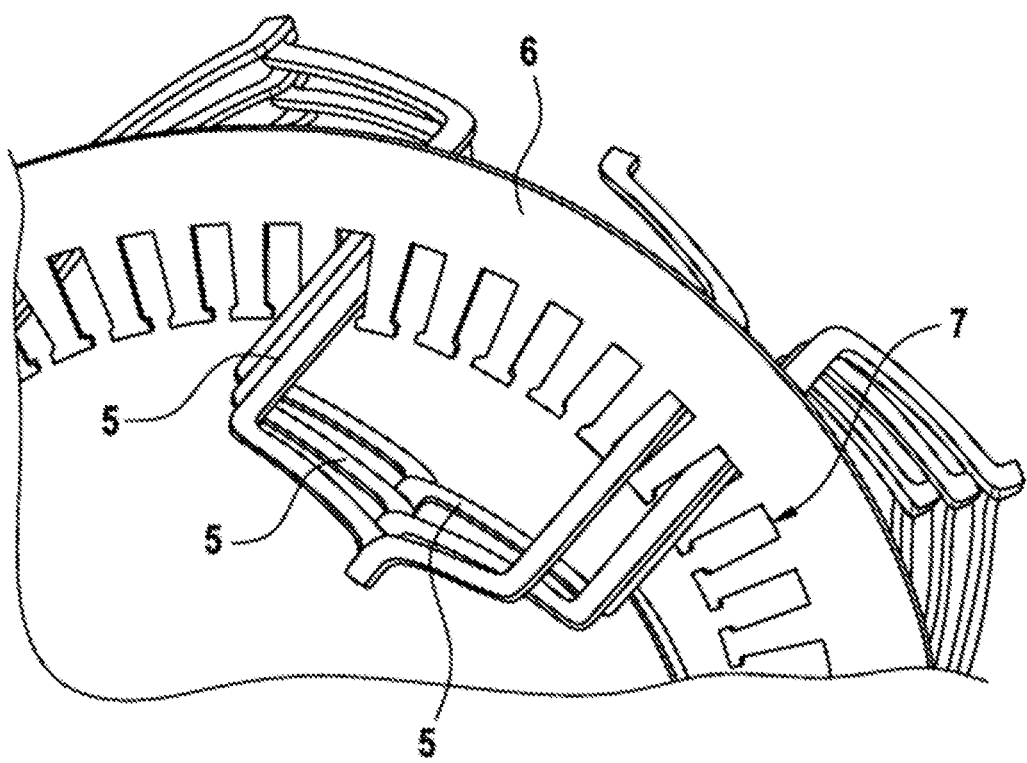
FIG. 3 shows a schematic partial view of the stator of the electric machine according to the exemplary embodiment of the invention.

FIG. 2 shows a schematic representation of the stator 2 of the electric machine 1 according to the exemplary embodiment of the invention. The stator 2 has a stator base body 6, to which a plug-in winding 4 is attached 4. The plug-in winding 4 is composed of a multiplicity of individual rigid insulated electrical conductor elements 5. This is shown in FIG. 3. Therefore, in particular, a multiplicity of I-shaped conductor elements 5 and/or U-shaped conductor elements 5 is provided, wherein these conductor elements 5 are inserted into stator grooves 7 of the stator base body 6. Conductor ends 17 of the electrical conductor elements 5 project out of the stator grooves 7, wherein the conductor ends 17 of the conductor elements 5 are appropriately connected to conductor ends 17 of other conductor elements 5 in order to form the plug-in winding 4, in particular to realize three separate winding phases on the stator base body 6. The stator base body 6 is advantageously composed of a stack of multiple individual laminations, wherein FIG. 3 shows only one of these stator laminations for the sake of simplicity and for better clarity.

As a result of a plug-in winding 4 which is constructed in this way, it is achieved that high electric currents can flow through the electrical conductor elements 5. In particular, the individual conductor elements 5 have a larger cross section than conventional conductors. In particular, a rectangular cross section is present. A current-carrying capacity of the individual conductor elements 5 is thus increased, resulting in the electrical machine 1 having a high output power.

Figure 4:
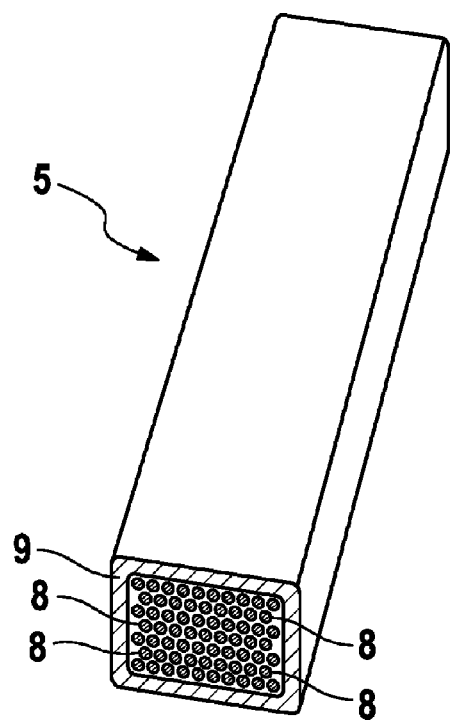
FIG. 4 shows a schematic view of a section through an electrical conductor element of a plug-in winding of the stator of the electric machine according to the exemplary embodiment of the invention.
Figure 4A:
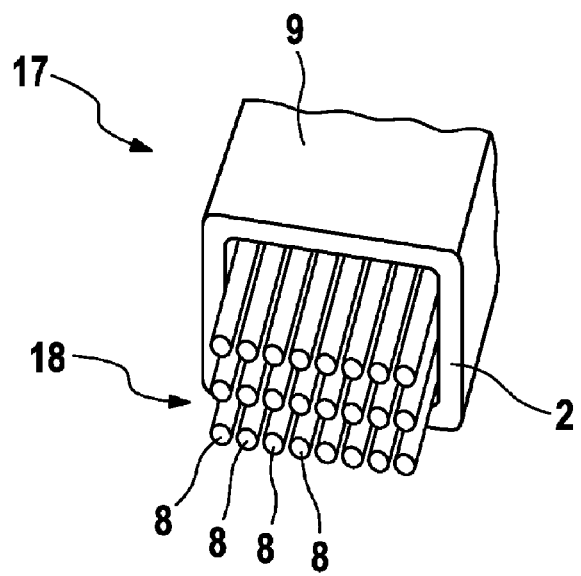
FIG. 4a shows a schematic view of an end region of the electrical conductor element of a plug-in winding of the stator of the electric machine according to the exemplary embodiment of the invention.

FIG. 4 shows a section through one of the insulated electrical conductor elements 5 which can be used to produce the plug-in winding 4. The electrical conductor element 5 is I-shaped in the exemplary embodiment shown in FIG. 2. FIG. 4A shows an end region of the conductor element 5.

The insulated electrical conductor element 5 comprises a multiplicity of flexible electrically conductive fibers 8, in particular of a conductor bundle of flexible fibers 8, made from carbon nanotubes (CNT). The flexible fibers 8 are arranged inside a sleeve-like or tubular and substantially rigid electrically insulating insulation sheath 9. The insulation sheath 9 is preferably formed from plastic, in particular from polyether ether ketone (PEEK).

Fiber ends 18 of the fibers 8 project out of the insulation sheath 9 at the conductor ends 17 of the conductor element 5 and are therefore not electrically insulated. These fiber ends 18 serve in particular for electrically connecting two connector elements 5 to produce the plug-in winding 4 as described above.

The flexible fibers 8 have a preferably textile behavior. Therefore the flexible fibers 8 can preferably be arranged with a high fill-density in the insulation sheath 9. The form of the conductor element 5 is therefore specified by the insulation sheath 9, since the rigid insulation sheath 9 gives the conductor element 5 a rigid form. The multiplicity of flexible fibers 8 moreover results in a high current-carrying capacity, whilst a low density and therefore a low weight of the conductor element 5 are realized through the use of carbon nanotubes. This enables the provision of an electric machine 1 with a high power density.

Figure 5:
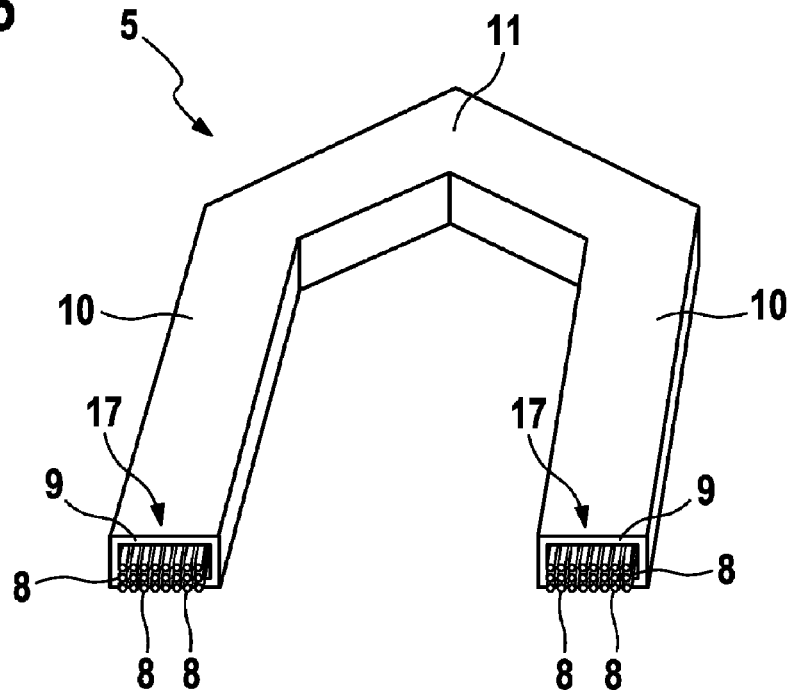
FIG. 5 shows a schematic view of a further electrical conductor element of the plug-in winding of the stator of the electric machine according to the exemplary embodiment of the invention.

FIG. 5 shows a further exemplary embodiment of an insulated electrical conductor element 5 having a multiplicity of flexible fibers 8. In contrast to the exemplary embodiment shown in FIG. 4, the insulated electrical conductor element 5 according to FIG. 5 is U-shaped.

The U-shaped insulated electrical conductor element 5 comprises two limbs 10, which are connected by a transverse region 11. Apart from the shape, the construction of the exemplary embodiment of the conductor element 5 which is shown in FIG. 4 does not differ from the exemplary embodiment of the conductor element 5 which is shown in FIG. 5. Therefore, a sleeve-like or tubular insulation sheath 9, in which a plurality of flexible fibers 8 are arranged, is also shown in FIG. 5. The flexible fibers 8 therefore extend from one limb 10 to the other limb 10 via the transverse region 11 and project out of the insulation sheath 9 with their fiber ends 18 at conductor ends 17 of the limbs 10. The advantages of the electrical conductor element 5 according to the exemplary embodiment illustrated in FIG. 5 are the same as those of the exemplary embodiment of the electrical conductor element 5 which is illustrated in FIG. 4.

In both exemplary embodiments, the conductor ends 17 of the conductor elements 15 can be electrically contacted in order to electrically connect the respective conductor element 5 to other components. In particular, the conductor elements 5 can be electrically contacted by one another to produce the plug-in winding 4. The conductor elements 5 can therefore be used in particular in the manner of conventional parts of a plug-in winding.

Figure 6:
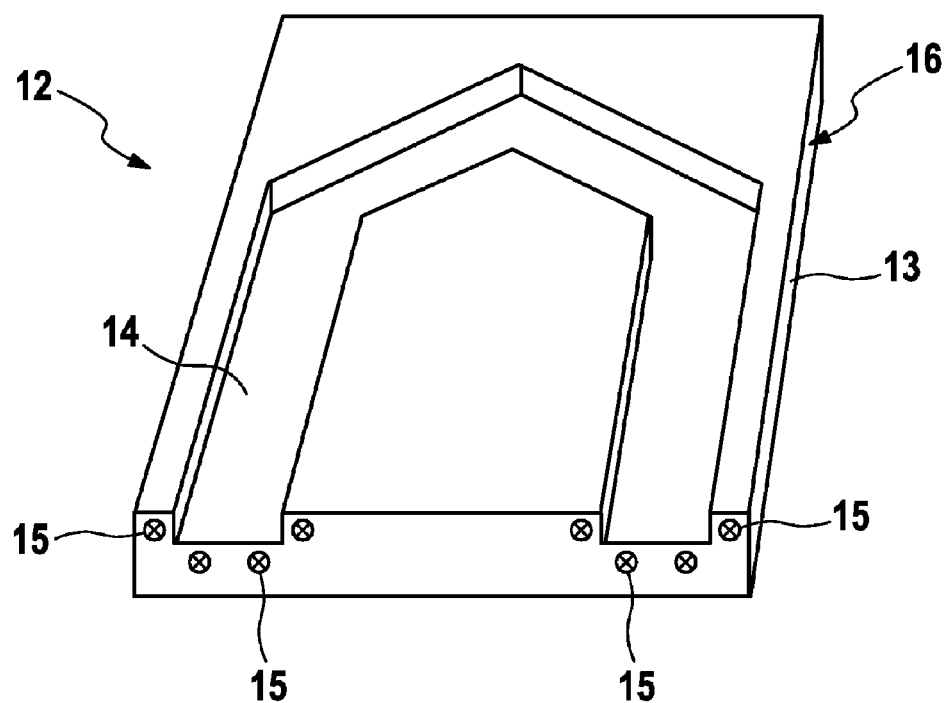
FIG. 6 shows a schematic view of a shaping device for carrying out a production method of the electrical conductor elements of the plug-in winding of the stator of the electric machine according to the exemplary embodiment of the invention.

FIG. 6 shows a shaping device 12 for producing the above-described insulated electrical conductor elements 5 according to an inventive method. The shaping device 12, shown by way of example, serves in particular for producing the insulated electrical conductor element 5 shown in FIG. 5.

The shaping device 12 has a base body 13 and a depression 14 formed in the base body 13. The depression 14 extends in a U shape and has, in particular, a quadrangular or rectangular cross-sectional form. Another course of the depression 14 is furthermore also conceivable, in particular an I-shaped path for producing the insulated electrical conductor element 5 shown in FIG. 4.

The shaping device 12 comprises a multiplicity of heating elements 15, which are fastened to the base body 13 and which are distributed around the depression 14. The heating elements 15 preferably have an elongated form, which extends along the depression 14. However, it is also conceivable to arrange a multiplicity of punctiform heating elements 15 along the depression 14.

The heating elements 15 are preferably designed as thermoelements. Alternatively, however, they can also be designed as a heating wire, for example. The heating elements 15 are preferably screwed into the base body 13. However, a plug-in connection between the heating elements 15 and the base body 13 is also conceivable.

To produce the insulated electrical conductor elements 5, a multiplicity of electrically conductive flexible fibers 8 is firstly guided through an insulation sheath 9. The insulation sheath 9 is sleeve-like or tubular with an angular or circular cross-sectional form and, at this point, does not have to have the final form of the conductor element 5. The insulation sheath 9, with the flexible fibers 8 arranged therein, is subsequently arranged in the depression 14 formed in the base body 13 of the shaping device 12.

After the insulation sheath 9 and the flexible fibers 8 have been arranged in the depression 14, the insulation sheath 9 is heated by the heating elements 15.

The insulation sheath 9 is preferably a thermoplastic material, in particular polyether ether ketone (PEEK). In this case, during the production of the conductor element 5, the insulation sheath 9 is heated to the thermoplastic range. The thermoplastic range is the temperature range in which the heated insulation sheath 9 remains plastically deformed, i.e. it does not assume its original form again.

The heat supply via the heating elements 15 is subsequently interrupted so that the insulation sheath 9 can preferably harden. The hardening can take place passively, i.e. the cooling of the insulation sheath 9 is effected merely by interrupting the heat supply and therefore without additional measures. However, the hardening can also be performed actively, for example using additional cooling elements and/or using means which effect the forced convection. In both cases, the insulation sheath 9 preferably remains in the depression 14 during the hardening in order to enable the conductor element 5 to form completely. This results in a high fill-density of the conductor element 5.

The conductor element 5, which substantially maintains the form of the depression 14 can subsequently be removed from the depression 14 in one piece. The conductor element 5 now has the fixed form created by the method.

The insulation sheath 9 is preferably shrinkable tubing and/or is manufactured from a material which has a negative coefficient of thermal expansion. The insulation sheath 9 is therefore preferably thermally shrunk onto the multiplicity of flexible fibers 8 and preferably designed to apply a tensile force to the flexible fibers 8, in particular the conductor bundle, located inside the insulation sheath during the heating by means of the heating elements 15. Tight packing of the fibers 8 and therefore a high fill-density of the conductor element 5 are therefore realized. Together with the low density of carbon nanotubes, it is therefore possible to achieve a high current-carrying capacity of the plug-in winding 4 formed by the conductor elements 5 along with a low weight. The electric machine 1 therefore has a high power density.

The invention claimed is:

1. An electric machine (1) having a rotor (3) and a stator (2), wherein the stator (2) and/or the rotor (3) has an electrical plug-in winding (4), which comprises a plurality of rigid insulated electrical conductor elements (5), wherein the conductor elements (5) are arranged in grooves of the stator (2) or the rotor (3) and project out of the grooves with conductor ends (17), wherein the conductor ends (17) of the conductor elements (5) are each connected to conductor ends (17) of other conductor elements (5) to form the electrical plug-in winding (4), wherein the conductor elements (5) each have an electrically insulating insulation sheath (9), tubularly surrounding a multiplicity of flexible fibers (8), and wherein the insulation sheath (9) is configured to give the electrical conductor element (5) a rigid form.

2. The electric machine (1) as claimed in claim 1, wherein the insulation sheath (9) is thermally shrunk onto the multiplicity of flexible fibers (8).

3. The electric machine (1) as claimed in claim 1, wherein the insulation sheath (9) braces the multiplicity of flexible fibers (8) in a conductor bundle, in the insulation sheath (9) with a tensile force.

4. The electric machine (1) as claimed in claim 1, wherein the insulation sheath (9) is formed from a thermoplastic material.

5. The electric machine (1) as claimed in claim 1, wherein the insulation sheath (9) includes an insulation material which has a negative coefficient of expansion.

6. The electric machine (1) as claimed in claim 1, wherein each conductor element (5) is configured in a U shape or I shape and has a quadrangular cross section.

7. The electric machine (1) as claimed in claim 1, wherein the flexible fibers (8) of each conductor element (5) project out of the respective insulation sheath (9) with the flexible fiber ends (18) at the two conductor ends (17) of the respective conductor element (5) in order to electrically connect the respective conductor element (5) to other conductor elements (5).

8. A method for producing substantially rigid insulated electrical conductor elements (5) for a plug-in winding (4) for a rotor (3) and/or a stator (2) of an electric machine (1), having the following steps:
surrounding a bundle of flexible fibers (9) made of carbon nanotubes or graphene with a tubular insulation sheath (9) to form a conductor element (5),
arranging the conductor element (5) in a shaping depression (14) of a shaping device (12),
heating the conductor element (5) in the depression of the shaping device (12) by at least one heating element (15) to a temperature which effects thermal shrinking of the insulation sheath (9), and
cooling the conductor element (5).

9. The method according to claim 8, wherein the electric machine (1) is an electric drive machine for an electrically driven vehicle, and wherein the conductor element (5) is heated to a temperature which effects a contraction of the insulation sheath (9).

10. An electric machine (1) having a rotor (3) and a stator (2), wherein the stator (2) and/or the rotor (3) has an electrical plug-in winding (4), which comprises a plurality of rigid insulated electrical conductor elements (5), wherein the conductor elements (5) are arranged in grooves of the stator (2) or the rotor (3) and project out of the grooves with conductor ends (17), wherein the conductor ends (17) of the conductor elements (5) are each connected to conductor ends (17) of other conductor elements (5) to form the electrical plug-in winding (4), wherein the conductor elements (5) each have an electrically insulating insulation sheath (9) tubularly surrounding a conductor bundle of flexible fibers (8) made of carbon nanotubes or graphene, and wherein the insulation sheath (9) is configured to give the electrical conductor element (5) a rigid form.

11. The electric machine (1) as claimed in claim 10, wherein the insulation sheath (9) is thermally shrunk onto the conductor bundle of flexible fibers (8).

12. The electric machine (1) as claimed in claim 11, wherein the insulation sheath (9) braces the conductor bundle in the insulation sheath (9) with a tensile force.

13. The electric machine (1) as claimed in claim 12, wherein the insulation sheath (9) is formed from polyether ether ketone.

14. The electric machine (1) as claimed in claim 13, wherein the insulation sheath (9) consists of an insulation material which has a negative coefficient of expansion.

15. The electric machine (1) as claimed in claim 14, wherein each conductor element (5) is configured in a U shape or I shape and has a rectangular cross section.

16. The electric machine (1) as claimed in claim 15, wherein the conductor bundle of each conductor element (5) project out of the respective insulation sheath (9) with the flexible fiber ends (18) at the two conductor ends (17) of the respective conductor element (5) in order to electrically connect the respective conductor element (5) to other conductor elements (5).

* * * * *